United States Patent
Jindal (10) Patent No.: US 10,291,594 B2
(45) Date of Patent: May 14, 2019

(54) SYSTEMS AND METHODS FOR DATA ENCRYPTION AND DECRYPTION

(71) Applicant: FMR LLC, Boston, MA (US)

(72) Inventor: Vishal Jindal, Boston, MA (US)

(73) Assignee: FMR LLC, Boston, MA (US)

( * ) Notice: Subject to any disclaimer, the term of this patent is extended or adjusted under 35 U.S.C. 154(b) by 127 days.

(21) Appl. No.: 15/691,980

(22) Filed: Aug. 31, 2017

(65) Prior Publication Data

US 2019/0068558 A1 Feb. 28, 2019

(51) Int. Cl.
| | |
|---|---|
| *H04L 29/06* | (2006.01) |
| *H04L 9/00* | (2006.01) |
| *H04L 9/14* | (2006.01) |
| *H04L 9/16* | (2006.01) |
| *H04L 9/08* | (2006.01) |
| *G06Q 20/38* | (2012.01) |
| *H04L 9/06* | (2006.01) |
| *H04L 9/12* | (2006.01) |

(52) U.S. Cl.
CPC ..... *H04L 63/0428* (2013.01); *G06Q 20/3823* (2013.01); *H04L 9/065* (2013.01); *H04L 9/0819* (2013.01); *H04L 9/0861* (2013.01); *H04L 9/0869* (2013.01); *H04L 9/14* (2013.01)

(58) Field of Classification Search
CPC ..... H04L 63/0428; H04L 9/0819; H04L 9/14; H04L 9/0861; H04L 9/0869; H04L 9/065; H04L 2209/24; G06Q 20/3823
See application file for complete search history.

(56) References Cited

U.S. PATENT DOCUMENTS

| | | | | |
|---|---|---|---|---|
| 5,199,069 A * | 3/1993 | Barrett | ............ | H04K 1/00 380/2 |
| 5,222,137 A * | 6/1993 | Barrett | ............ | H04L 9/0894 380/271 |
| 5,483,596 A * | 1/1996 | Rosenow | ............ | G06F 21/31 380/277 |
| 6,490,353 B1 * | 12/2002 | Tan | ............ | H04L 9/088 380/278 |
| 6,907,123 B1 * | 6/2005 | Schier | ............ | H04K 1/00 370/335 |
| 7,023,997 B1 * | 4/2006 | Schier | ............ | H04L 9/16 380/277 |
| 7,434,052 B1 * | 10/2008 | Rump | ............ | H04N 7/1675 348/E7.056 |

(Continued)

*Primary Examiner* — Michael Simitoski
(74) *Attorney, Agent, or Firm* — Proskauer Rose LLP (57) ABSTRACT

A computer-implemented method is provided for encrypting a message using a plurality of keys and a plurality of encryption algorithms. The method includes mapping, by the computing device, each of the plurality of keys to an encryption algorithm randomly selected from the plurality of encryption algorithms, and storing, by the computing device, in an index table the plurality of keys correlated to their respective encryption algorithms. The method also includes decomposing, by the computing device, the message into one or more message segments and encrypting, by the computing device, each of the one or more message segments using the index table. The method further includes transmitting, by the computing device, at least one of the index table or the one or more encrypted message segments to a receiving computing device over the electronic network.

22 Claims, 4 Drawing Sheets

(56) References Cited

U.S. PATENT DOCUMENTS

| | | | |
|---|---|---|---|
| 8,687,810 B2 | 4/2014 | Bukshpun et al. | |
| 8,966,285 B2 | 2/2015 | Farrugia et al. | |
| 9,021,269 B2 | 4/2015 | Spilman | |
| 9,544,138 B2 | 1/2017 | Nagai et al. | |
| 2001/0007127 A1* | 7/2001 | Staring | H04L 9/12 713/160 |
| 2010/0211787 A1* | 8/2010 | Bukshpun | H04L 9/0838 713/170 |
| 2011/0194686 A1* | 8/2011 | Stedron | G09C 1/02 380/28 |
| 2012/0063597 A1 | 3/2012 | Tropp et al. | |
| 2012/0250863 A1* | 10/2012 | Bukshpun | H04L 9/0838 380/278 |
| 2013/0236018 A1* | 9/2013 | Nakano | G06F 21/10 380/277 |
| 2013/0311775 A1* | 11/2013 | Nair | H04L 63/0428 713/167 |
| 2013/0322618 A1* | 12/2013 | Coleridge | G06F 21/6227 380/44 |
| 2014/0245002 A1* | 8/2014 | Hayward | H04L 63/0428 713/162 |
| 2014/0344574 A1* | 11/2014 | Rhoads | G11B 20/00086 713/167 |
| 2015/0117639 A1* | 4/2015 | Feekes | H04L 9/16 380/28 |
| 2015/0350894 A1* | 12/2015 | Brand | H04L 63/0435 380/270 |
| 2016/0219024 A1* | 7/2016 | Verzun | H04L 63/102 |
| 2017/0070483 A1* | 3/2017 | Sammet | H04L 63/0428 |
| 2017/0111324 A1* | 4/2017 | Hayward | H04L 63/0464 |
| 2018/0181765 A1* | 6/2018 | Rietsch | G06F 21/6245 |
| 2018/0359811 A1* | 12/2018 | Verzun | H04W 88/16 |

\* cited by examiner

SYSTEMS AND METHODS FOR DATA ENCRYPTION AND DECRYPTION

TECHNICAL FIELD

This application relates generally to systems, methods and apparatuses, including computer program products, for encrypting and decrypting a message using multiple keys.

BACKGROUND

One known approach for sharing data between two parties involves using a symmetric key algorithm, according to which the same cryptographic keys for both encryption and decryption of data is used. For example, if a sender wants to send a private text message to a recipient, the sender uses a shared key, known to both parties, to encrypt the message employing a symmetric encryption algorithm, such as an Advanced Encryption Standard (AES), Triple Data Encryption Standard (3DES), International Data Encryption Algorithm (IDEA), or the like. Then, the sender encrypts the shared key with the recipient's public key and sends the encrypted shared key to the recipient. The recipient decrypts the encrypted key with her private key to obtain the shared key and uses it to decrypt the private message. However, one shortcoming of this approach is that an attacker can intercept the encrypted message and use a brute force technique to guess the shared key, thereby decrypting the encrypted message without obtaining the key from the sender. An assumption of this approach is that the attacker knows which algorithm is used to encrypt the message, which can also be guessed by the attacker.

Thus, there is a need to improve the traditional symmetric key algorithm for sharing private data between parties such that an attacker cannot easily guess the shared key and/or the encryption algorithm used.

SUMMARY

The systems and methods of the present invention provide a random-key algorithm that enhances a traditional symmetric algorithm for encrypting data. Using the random-key algorithm of the present invention, neither the sender nor the recipient can easily determine which key(s) and what encryption method(s) are used for data encryption.

In one aspect, a computer-implemented method for encrypting a message, using a plurality of keys and a plurality of encryption algorithms, is provided for communication over an electronic network. The method includes mapping, by the computing device, each of the plurality of keys to an encryption algorithm randomly selected from the plurality of encryption algorithms, and storing, by the computing device, in an index table the plurality of keys correlated to their respective encryption algorithms. The method also includes decomposing, by the computing device, the message into one or more message segments. The method additionally includes encrypting, by the computing device, each of the one or more message segments using the index table. Encrypting each message segment involves randomly selecting, by the computing device, an entry from the index table, and encrypting, by the computing device, the message segment using the key and the encryption algorithm corresponding to the randomly-selected entry to produce an encrypted message segment. The method further includes transmitting, by the computing device, at least one of the index table or the one or more encrypted message segments to a receiving computing device over the electronic network.

In another aspect, a computer program product, tangibly embodied in a non-transitory computer readable medium of a communication device, is provided for encrypting a message using a plurality of keys and a plurality of encryption algorithms. The computer program product includes instructions operable to cause the communication device to generate the plurality of keys, map each of the plurality of keys to an encryption algorithm randomly selected from the plurality of encryption algorithms, and store the plurality of keys correlated to their respective encryption algorithms in an index table. The computer program product also includes instructions operable to cause the communication device to decompose the message into one or more message segments and encrypt each of the one or more message segments based on the index table by (i) randomly selecting an entry from the index table and (ii) encrypting the message segment using the key and the encryption algorithm corresponding to the randomly-selected entry to produce an encrypted message segment. The computer program product further includes instructions operable to cause the communication device to transmit at least one of the index table or the one or more encrypted message segments to a receiving computing device.

Any of the above aspects can include one or more of the following features. In some embodiments, each encryption algorithm is a symmetric encryption algorithm. In some embodiments, the index table is encrypted prior to transmitting the index table to the receiving computing device. The index table can be encrypted using an asymmetric encryption algorithm. In some embodiments, the index table and the one or more encrypted message segments are transmitted to the receiving computing device over separate communication networks.

In some embodiments, a user specifies a number of keys to be generated for the index table and/or a number of segments for decomposing the message. In some embodiments, a user provides the plurality of encryption algorithms.

In some embodiments, transmitting the index table to the receiving computing device comprises storing the index table at a database accessible by the receiving computing device.

In another aspect, a computer-implemented method is provided for decrypting an encrypted message communicated over an electronic network. The method comprises receiving, by a computing device, the encrypted message comprising one or more encrypted message segments, and accessing, by the computing device, an index table corresponding to the encrypted message, the index table configured to store a plurality of keys each correlates to an encryption algorithm. The method also comprises decrypting, by the computing device, each of the one or more encrypted message segments using the index table. Decrypting each encrypted message segment includes: (a) selecting, by the computing device, an entry from the index table, (b) attempting to decrypt, by the computing device, the encrypted message segment using the key and the encryption algorithm corresponding to the selected entry of step (a), and (c) if the encrypted message cannot be decrypted by the selected entry, repeating steps (a)-(c) by selecting another entry in the index table until the encrypted message segment is decrypted by the selected entry. The method further comprises combining, by the computing device, the decrypted message segments to obtain a decrypted version of the encrypted message.

In some embodiments, the method includes decrypting the index table. For example, the index table can be decrypted using an asymmetric decryption algorithm.

In some embodiments, the entries from the index table that are used to decrypt an encrypted message segment are sequentially selected from the index table. In some embodiments, the entries from the index table that are used to decrypt an encrypted message segment are randomly selected from the index table.

In some embodiments, each encryption algorithm of the index table comprises a symmetric algorithm.

Yet in another aspect, a computer-implemented method is provided for communicating a message securely between a transmitting computing device and a receiving computing device. The method includes generating, by the transmitting computing device, an index table with a plurality of entries, each entry including a key and a randomly-selected encryption algorithm, and decomposing, by the transmitting computing device, the message into one or more message segments. The method also includes encrypting, by the transmitting computing device, each of the one or more message segments by randomly selecting an entry from the index table and encrypting the message segment using the key and the encryption algorithm of the randomly-selected entry to produce an encrypted message segment. The method additionally includes transmitting, by the computing device the one or more encrypted message segments to the receiving computing device. The method further includes accessing, by the receiving computing device, the index table upon receiving the one or more encrypted message segments, and decrypting, by the receiving computing device, each of the one or more encrypted message segments by repeatedly and sequentially selecting an entry from the index table and attempting to decrypt the encrypted message segment using the key and the encryption algorithm of the sequentially-selected entry until decryption is successful. The method further includes combining, by the receiving computing device, the decrypted message segments to recover the message.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
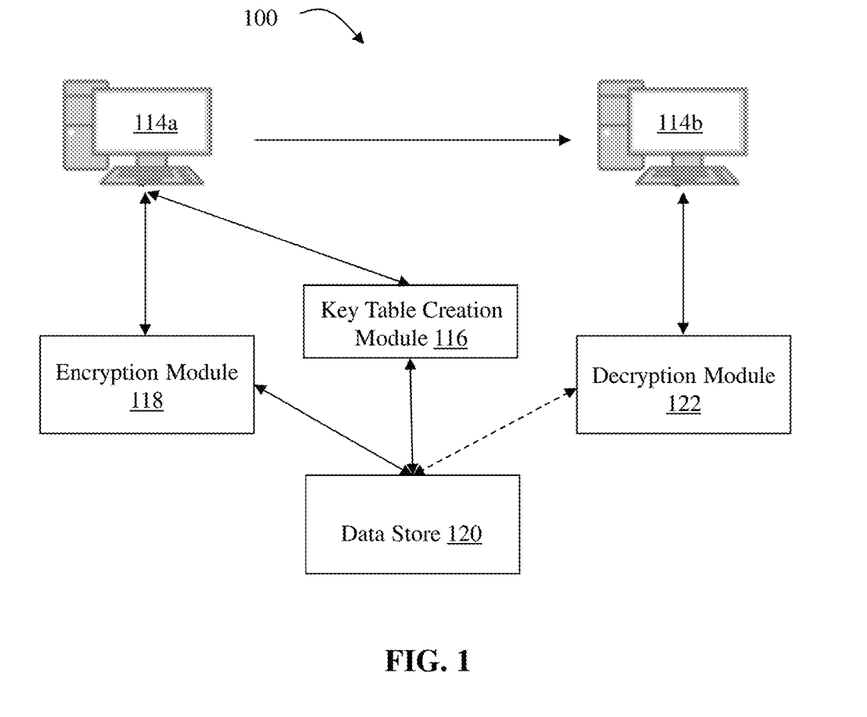
FIG. 1 is a block diagram of a system in a computing environment in which encryption and decryption occur, according to some embodiments of the present invention.

FIG. 1 is a block diagram of a system 100 in a computing environment in which encryption and decryption occur, according to some embodiments of the present invention. As shown, the system 100 includes a sender computing device 114a and a recipient computing device 114b, an encryption module 118, a decryption module 122, a key table creation module 116 and a data store (e.g., database) 120.

Each of the sender and recipient computing devices 114a, 114b is configured to connect to a communications network (not shown) to communicate with each other, as well as with the data store 120. In some embodiments, the sender computing device 114a also communicates with the encryption module 118 and the key table creation module 116. Each of the sender and recipient client computing devices 114a, 114b can provide a graphical user interface (GUI) to facilitate viewing of inputs to and outputs from the encryption/decryption methods and systems described herein. Exemplary sender and recipient computing devices 114a, 114b include but are not limited to desktop computers, laptop computers, tablets, mobile devices, smartphones, and internet appliances. It should be appreciated that other types of computing devices that are capable of connecting to the components of the system 100 can be used without departing from the scope of invention.

Each of the encryption module 118, the decryption module 122, and the key table creation module 116 is a combination of (i) hardware, including one or more processors and one or more physical memory modules, and (ii) specialized software engines that execute on a processor to receive data from other components of the system 100, transmit data to other components of the system 100, and perform functions for encryption or decryption as described herein. In some embodiments, the modules 116, 118, 122 are specialized sets of computer software instructions programmed onto a dedicated processor and can include specifically-designated memory locations and/or registers for executing the specialized computer software instructions. The encryption module 118 and the key table creation module 116 can be executed on the same processor or different processors. The decryption module 122 is adapted to be executed on a different processor than the encryption module 118. Further explanation of the specific processing performed by the modules 116, 118, 122 will be provided below.

The data store 120 is a computing device (or in some embodiments, a set of computing devices) that is accessible to at least one of the sender computing device 114a or the recipient computing device 114b and is configured to provide, receive and store one or more keys for encryption and decryption as described herein. All or a portion of the data store 120 can be either integrated with the processor executing the encryption module 118 or located on a computing device or devices separate from the encryption module 118. In some embodiments, the data store 120 comprises one or more databases, such as MySQL™ available from Oracle Corp. of Redwood City, Calif.

Generally, a communications network (not shown) of the present invention enables components of the system 100 to communicate with each other to perform the process of encrypting and decrypting data as described herein. The network may be a local network, such as a LAN, or a wide area network, such as the Internet and/or a cellular network. In some embodiments, the network is comprised of several discrete networks and/or sub-networks (e.g., cellular to Internet) that enable the components of the system 100 to communicate with each other.

Generally, the system 100 provides encryption and decryption approaches that complicate the traditional cryptographic methods. Using the system 100 of FIG. 1, neither the sender nor the recipient is likely to know which key(s) and what encryption method(s) are used to encrypt the data message. In some embodiments, the encryption module 118, the key table creation module 116 and the data store 120 are associated with the sender and accessible via the sender computing device 114a, while the decryption module 122 is associated with the recipient and accessible by via recipient computing device 114b. In some embodiments, at least a portion of the data store 120 is also accessible by the recipient.

Figure 2:
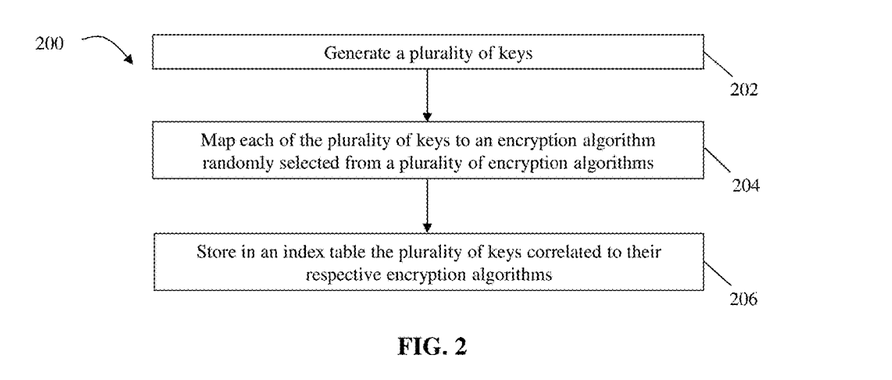
FIG. 2 is a flow diagram of a process executed by the key table creation module of the system of FIG. 1 for generating key(s) and selecting encryption method(s), according to some embodiments of the present invention.
Figure 3:
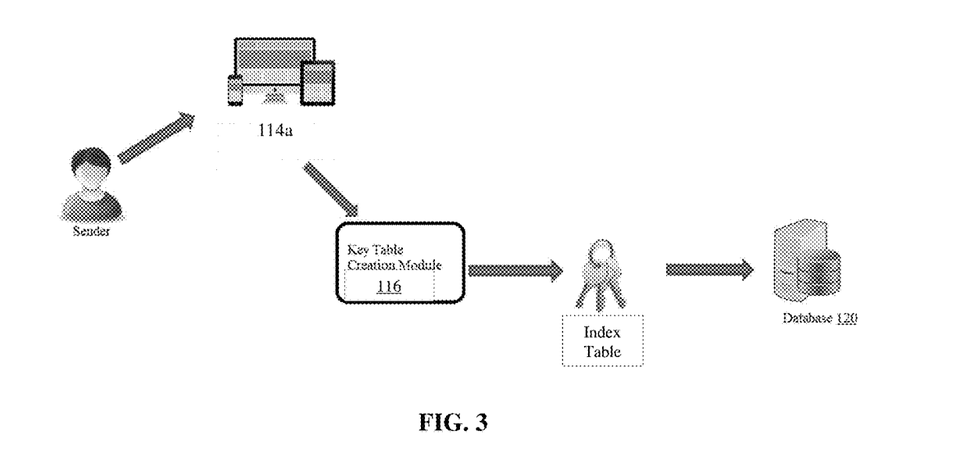
FIG. 3 illustrates the process of FIG. 2 utilizing at least a portion of the computing environment of FIG. 1, according to some embodiments of the present invention.

FIG. 2 is a flow diagram of a process 200 executed by the key table creation module 116 of the system of FIG. 1 for generating key(s) and selecting encryption method(s), according to some embodiments of the present invention. FIG. 3 illustrates the process 200 of FIG. 2 utilizing at least a portion of the computing environment 100 of FIG. 1, according to some embodiments of the present invention. The key table creation module 116 initiates the process 200 when a sender, via the sender computing device 114a, indicates that he would like to encrypt a message and send the message to a recipient. At step 202 of the process 200, the key table creation module 116 is adapted to generate multiple keys and/or select multiple encryption algorithms for encrypting the message. In some embodiments, in response to the sender specifying the number of keys ($k_n$) to generate, the key table creation module 116 randomly generates the $k_n$ keys such that the keys are created with no linkage or relationship among one another. This ensures that if one key is comprised by an attacker, the other keys cannot be guessed or otherwise obtained. In some embodiments, the keys are provided by the sender to the key table creation module 116 in a format similar to passwords. The module 116 can allow the sender to enter as many keys as he wants. These keys do not need to be of a fixed length. The key table creation module 116 can pad the keys to achieve a desired length. The sender can also specify, via the sender computing device 114a, one or more encryption algorithms, such as an Advanced Encryption Standard (AES), Data Encryption Standard (DES), International Data Encryption Algorithm (IDEA), or the like. These encryption algorithms can be symmetric encryption algorithms. Alternatively, the key table creation module 116 can randomly select the encryption algorithms if the sender specifies the number of encryption algorithms desired (N) and their type (e.g., symmetric or asymmetric).

At step 204 of the process 200, the key table creation module 116 creates an index table by randomly mapping each of the $k_n$ keys to one of the N encryption algorithms and assigning an index number to the mapping. The number of algorithms N does not need to be same as the number of keys $k_n$, as the key table creation module 116 is adapted to map algorithms to keys in andom combinations and orders. As an example, if the sender specifies that 2 keys should be generated, the key table creation module 116 randomly generates 2 keys, i.e., XX and YY. Alternatively, the 2 keys are supplied by the sender to the key table creation module 116. The sender can also provide two encryption algorithms, i.e., AES and IDEA. Even though in this example the number of encryption algorithms is the same as the number of keys, in other embodiments the number of encryption algorithms can be greater than or less than the number of keys. The key table creation module 116 then generates an index table as shown below:

TABLE 1

An exemplary index table that maps keys to encryption algorithms.

| Index Number | Key | Algorithm |
|---|---|---|
| 1 | YY | AES |
| 2 | XX | IDEA |

As shown in Table 1, in the first entry, which is assigned index #1, the key YY is randomly mapped to the algorithm AES. In the second entry, which is assigned index #2, the key XX is randomly mapped to the algorithm IDEA. Generally, an index table, such as Table 1 shown above, can be expanded by adding more keys and/or more algorithms. However, this may reduce the efficiency of decryption, as explained below.

At step 206 of the process 200, the key table creation module 116 stores the resulting index table in the data store 120. In some embodiments, the index table is accessible to both the sender computing device 114a and the recipient computing device 114b. For example, an encrypted version of the index table is accessible to the recipient so as to protect the data in the index table. In some embodiments, the index table is saved securely on the sender's system to ensure that it cannot be comprised by a third party, including the recipient. Hence, the sender computing device 114a can send an encrypted version of the index table to the recipient's computing device 114b, as described in detail below.

Figure 4:
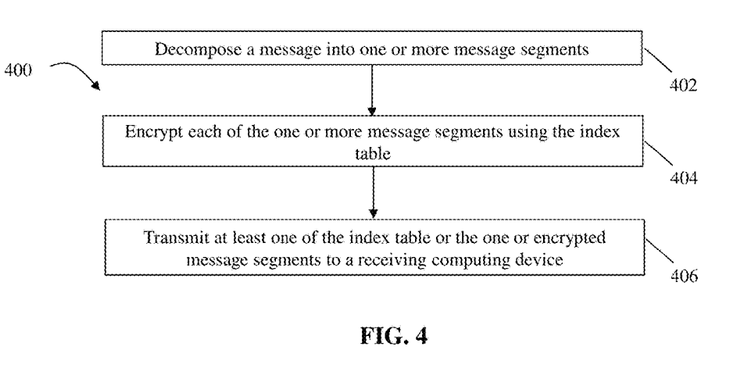
FIG. 4 is a flow diagram of a process executed by the encryption module of the system of FIG. 1 for encrypting a sender's message, according to some embodiments of the present invention.
Figure 5:
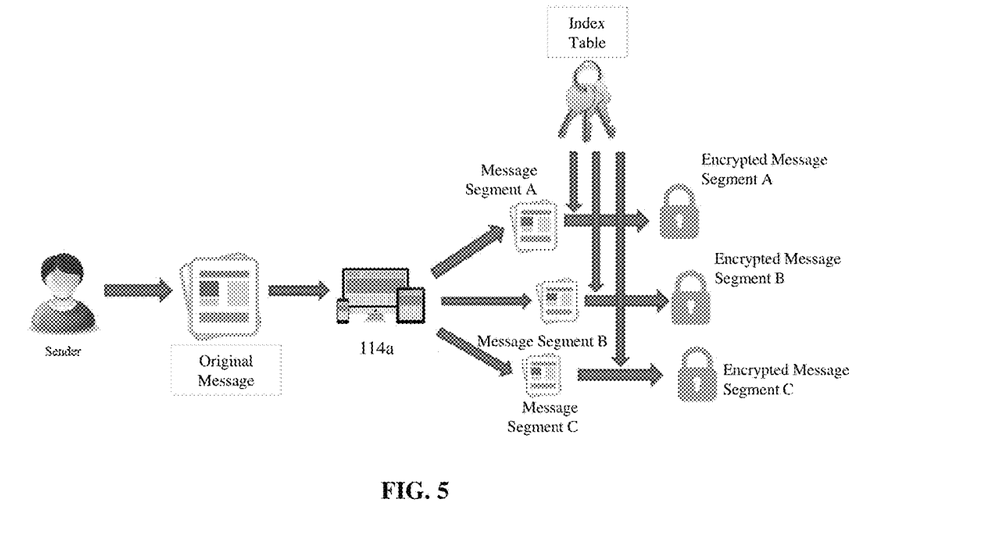
FIG. 5 illustrates the process of FIG. 4 utilizing at least a portion of the computing environment of FIG. 1, according to some embodiments of the present invention.

FIG. 4 is a flow diagram of a process 400 executed by the encryption module 118 of the system 100 of FIG. 1 for encrypting a sender's message, according to some embodiments of the present invention. FIG. 5 illustrates the process of FIG. 4 utilizing at least a portion of the computing environment of FIG. 1, according to some embodiments of the present invention. Process 400 starts after the index table creation process 200 of FIG. 2 and upon receiving a message from the sender for transmission to a recipient. The sender can provide the message to the encryption module 118 via the sender computing device 114a. At step 402 of the process 400, the encryption module 118 is configured to decompose the message into multiple segments. The number of segments is specifiable by the sender or automatically determined by the encryption module 118 based on, for example, the length of the message. At step 404, the encryption module 118 is adapted to encrypt each of the message segments using the index table created by the process 200 as described above. Specifically, for each message segment, the encryption module 118 randomly selects an entry from the index table, such as an index number from the index table and encrypts the message with with the key and the encryption algorithm corresponding to the selected index number. In general, the number of message segments does not need to be the same (i.e., can be greater or less than) the number of entries in the index table.

In one example, the sender desires to transmit a message that is decomposed into three segments A, B, and C by the decryption module 118. Using the index table of FIG. 1, the encryption module 118 encrypts segment A by randomly selecting the entry in the index table corresponding to index

1. Thus, the the encryption module 118 encrypts segment A with the key YY and the encryption algorithm AES. For segment B, the encryption module 118 encrypts the segment by randomly selecting the entry in the index table corresponding to index #2. Thus, the encryption module 118 encrypts segment B with the key XX and the encryption algorithm IDEA. For segment C, the encryption module 118 encrypts the segment by randomly selecting the entry in the index table that also corresponds to index #2. Thus, the encryption module 118 encrypts segment C also with the key XX and the encryption algorithm IDEA.

At step 406 of the process 400, the encryption module 118 is configured to transmit the encrypted message segments to a recipient via the recipient computing device 114b. These encrypted segments can be transmitted over the same communication channel or different channels. In some embodiments, each encrypted segment also contains information (e.g., in its header section) that specifies its order in the overall message chain. In some embodiments, the encryption module 118 additionally encrypts the index table using, for example, an asymmetric encryption algorithm based on a public key, and the resulting encrypted index table can be decrypted by the recipient using a corresponding private key to ensure that only the intended recipient can access the data in the index table. In some embodiments, the encrypted index table is stored in the database 120 that is also accessible by the recipient. Alternatively, the sender computing device 114a transmits the encrypted index table to the recipient computing device 114b over a communication channel that can be the same as or different from the channel over which the encrypted message segments are sent.

Figure 6:
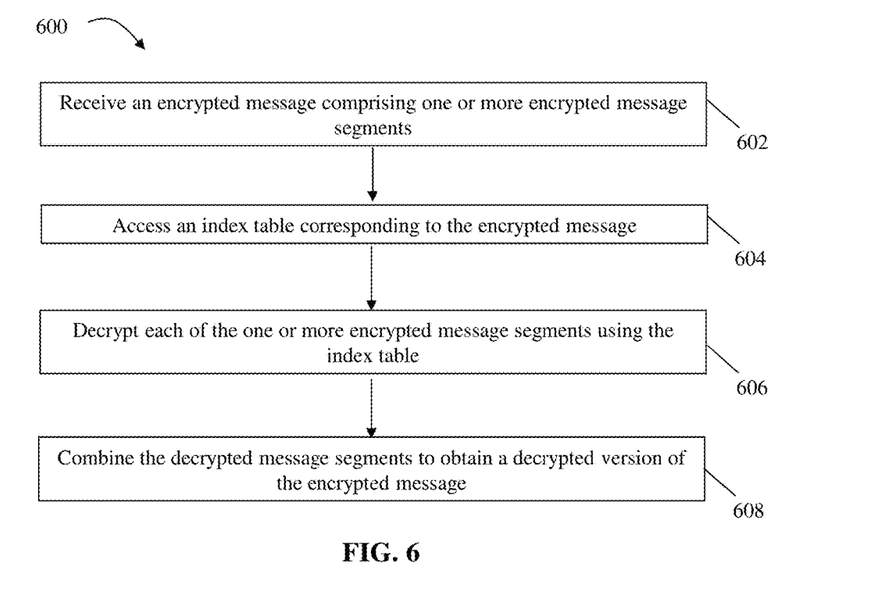
FIG. 6 is a flow diagram of a process executed by the decryption module of the system of FIG. 1 for decrypting a message, according to some embodiments of the present invention.
Figure 7:
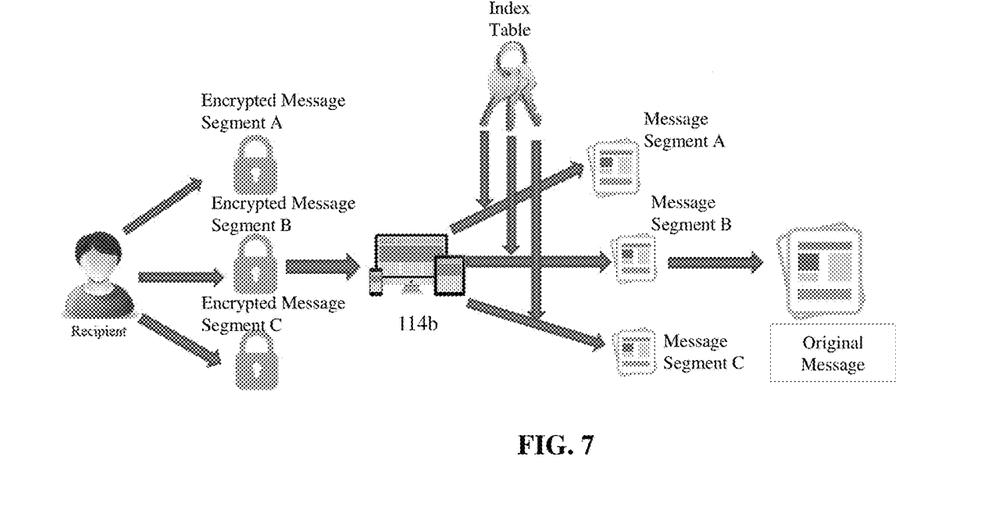
FIG. 7 illustrates the process of FIG. 6 utilizing at least a portion of the computing environment of FIG. 1, according to some embodiments of the present invention.

FIG. 6 is a flow diagram of a process 600 executed by the decryption module 122 of the system 100 of FIG. 1 for decrypting a message, according to some embodiments of the present invention. FIG. 7 illustrates the process of FIG. 6 utilizing at least a portion of the computing environment of FIG. 1, according to some embodiments of the present invention. The process 600 starts at step 602 when the recipient receives an encrypted message including multiple encrypted message segments from the sender. At step 604, to decrypt these message segments, the recipient accesses the encrypted index table via the database 120 or through a separate communication channel established by the sender. The recipient is required to decrypt the encrypted index table using a decryption key, which can be the same as the encryption key if a symmetric encryption approach had been used to encrypt the index table or a different private key if an asymmetric encryption approach had been used.

At step 606, for each encrypted message segment, the decryption module 122 tries to decrypt the message segment by selecting an entry from the index table, decrypting the message segment using the key and encryption algorithm corresponding to that selected entry, and selecting a different entry from the index table if decryption is not successful. In some embodiments, the decryption module 122 sequentially selects entries from the index table to try to decrypt a message segment until decryption is successful. For example, for the encrypted message A of the example described above with respect to FIGS. 4 and 5, the decryption module 122 initially selects the first entry under index #1 and uses the corresponding key YY and algorithm AES to try to decrypt the message. This decryption attempt is successful. For the encrypted message B, the decryption module 122 also starts by selecting the first entry under index #1 and uses the corresponding key YY and algorithm AES to try to decrypt the message. This decryption attempt is not successful. The decryption module 122 then proceeds to the next entry under index #2 and uses the corresponding key XX and algorithm IDEA to try to decrypt the message, and this decryption attempt is successful. For the encrypted message C, the decryption module 122 repeats the same process and determines that the entry corresponding to index #2 is successful for decrypting the message. Generally, for the sequential selection of entries to decrypt a particular message, the security of the algorithm is dependent on the number of keys ($k_n$) in the index table. The more keys are used, the more secure the algorithm is against external attacks. However, the efficiency of the decryption mechanism deteriorates corresponding to the number of keys in the index table. Specifically, more keys mean more time spent by the decryption module 122 decrypting a particular message segment. In some embodiments, a sender controls the balance between security and cryptographic efficiency. Specifically, since a sender can decide the number of keys for use in a cryptographic process, if the sender desires more secure communication and is ready to accept delays in decryption (e.g., for email communications), the sender can specify a large set of keys to ensure that it is difficult for a hacker to guess those keys. On the other hand, if the sender is unwilling to compromise on efficiency and speed (e.g., for phone line communication), the sender can specify a smaller set of keys, but with a trade-off on security. Alternatively, the decryption module 122 can randomly select entries from the index table to try to decrypt a message.

At step 608 of the process 600, the decryption module 122 is adapted to combine the decrypted message segments to obtain a decrypted version of the original message in its entirety. The decryption module 122 can piece together the decrypted message segments based on, for example, the header information in each message segment that reveals the order of the corresponding segment in the overall message chain.

Thus, the present encryption/decryption algorithm improves data security by increasing the complexity and resources required to decrypt data. For example, one of the advantages of this algorithm is that it complicates the process of an attacker guessing the encryption key(s) by a factor of N, which is the number of algorithms provided in the index table of the present invention. Further, the attacker needs to guess not only the multiple keys in the index table, but also the encryption algorithms used to encrypt the segments. Generally, the more number of keys and algorithms a sender chooses for the index table, the harder it is for an attacker to decrypt data using means like brute force. In some embodiments, the same index table is used to encrypt and decrypt multiple messages transmitted over multiple communications sessions. In some embodiments, the encryption/decryption algorithm of the present invention is used in a scenario where continuous delivery of data is not a constraint. For example, it can be used to encrypt emails, financial transactions, internet traffic, etc., where uninterrupted data streaming services are not required.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed-computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer-implemented method for encrypting a message, using a plurality of keys and a plurality of encryption algorithms, for communication over an electronic network, the method comprising:
    mapping, by the computing device, each of the plurality of keys to an encryption algorithm randomly selected from the plurality of encryption algorithms;
    storing, by the computing device, in an index table the plurality of keys correlated to their respective encryption algorithms;
    decomposing, by the computing device, the message into one or more message segments;
    encrypting, by the computing device, each of the one or more message segments using the index table, wherein encrypting each message segment includes:
        randomly selecting, by the computing device, an entry from the index table; and
        encrypting, by the computing device, the message segment using the key and the encryption algorithm corresponding to the randomly-selected entry to produce an encrypted message segment; and
    transmitting, by the computing device, at least one of the index table or the one or more encrypted message segments to a receiving computing device over the electronic network.

2. The computer-implemented method of claim 1, wherein each encryption algorithm is a symmetric encryption algorithm.

3. The computer-implemented method of claim 1, further comprising encrypting the index table prior to transmitting the index table to the receiving computing device.

4. The computer-implemented method of claim 3, further comprising encrypting the index table using an asymmetric encryption algorithm.

5. The computer-implemented method of claim 1, wherein the index table and the one or more encrypted message segments are transmitted to the receiving computing device over separate communication networks.

6. The computer-implemented method of claim 1, further comprising receiving, by the computing device, instructions specifying a number of the keys.

7. The computer-implemented method of claim 1, further comprising receiving, by the computing device, instructions specifying a number of segments for decomposing the message.

8. The computer-implemented method of claim 1, further comprising receiving, by the computing device, the plurality of encryption algorithms provided by a user.

9. The computer-implemented method of claim 1, further comprising receiving, by the computing device, the plurality of keys provided by a user.

10. The computer-implemented method of claim 6, further comprising randomly generating, by the computing device, the plurality of keys based on the number of the keys specified.

11. The computer-implemented method of claim 1, wherein transmitting the index table to the receiving computing device comprises storing the index table at a database accessible by the receiving computing device.

12. A computer-implemented method for decrypting an encrypted message communicated over an electronic network, the method comprising:
    receiving, by a computing device, the encrypted message comprising one or more encrypted message segments;
    accessing, by the computing device, an index table corresponding to the encrypted message, the index table configured to store a plurality of keys each randomly correlated to an encryption algorithm;
    decrypting, by the computing device, each of the one or more encrypted message segments using the index table, wherein decrypting each encrypted message segment includes:
        (a) selecting, by the computing device, an entry from the index table;
        (b) attempting to decrypt, by the computing device, the encrypted message segment using the key and the encryption algorithm corresponding to the selected entry of step (a); and
        (c) if the encrypted message cannot be decrypted by the selected entry, repeating steps (a)-(c) by selecting another entry in the index table until the encrypted message segment is decrypted by the selected entry; and
    combining, by the computing device, the decrypted message segments to obtain a decrypted version of the encrypted message.

13. The computer-implemented method of claim 12, further comprising decrypting the index table.

14. The computer-implemented method of claim 13, wherein the index table is decrypted using an asymmetric decryption algorithm.

15. The computer-implemented method of claim 12, wherein the entries from the index table that are used to decrypt an encrypted message segment are sequentially selected from the index table.

16. The computer-implemented method of claim 12, wherein the entries from the index table that are used to decrypt an encrypted message segment are randomly selected from the index table.

17. The computer-implemented method of claim 12, wherein each encryption algorithm of the index table comprises a symmetric algorithm.

18. A computer-implemented method for communicating a message securely between a transmitting computing device and a receiving computing device, the method comprising:
    generating, by the transmitting computing device, an index table with a plurality of entries, each entry including a key and a randomly-selected encryption algorithm;
    decomposing, by the transmitting computing device, the message into one or more message segments;
    encrypting, by the transmitting computing device, each of the one or more message segments by randomly selecting an entry from the index table and encrypting the message segment using the key and the encryption algorithm of the randomly-selected entry to produce an encrypted message segment;
    transmitting, by the transmitting computing device, the one or more encrypted message segments to the receiving computing device;
    accessing, by the receiving computing device, the index table upon receiving the one or more encrypted message segments;
    decrypting, by the receiving computing device, each of the one or more encrypted message segments by repeatedly and sequentially selecting an entry from the index table and attempting to decrypt the encrypted message segment using the key and the encryption algorithm of the sequentially-selected entry until decryption is successful; and combining, by the receiving computing device, the decrypted message segments to recover the message.

19. A computer program product, tangibly embodied in a non-transitory computer readable medium of a communication device, for encrypting a message using a plurality of keys and a plurality of encryption algorithms, the computer program product including instructions operable to cause the communication device to:

map each of the plurality of keys to an encryption algorithm randomly selected from the plurality of encryption algorithms;

store the plurality of keys correlated to their respective encryption algorithms in an index table;

decompose the message into one or more message segments;

encrypt each of the one or more message segments based on the index table by (i) randomly selecting an entry from the index table and (ii) encrypting the message segment using the key and the encryption algorithm corresponding to the randomly-selected entry to produce an encrypted message segment; and transmit at least one of the index table or the one or more encrypted message segments to a receiving computing device.

20. The computer program product of claim 19, wherein each encryption algorithm is a symmetric encryption algorithm.

21. The computer program product of claim 19, wherein the computer program product includes instructions operable to further cause the communication device to use an asymmetric encryption scheme to encrypt the index table.

22. The computer program product of claim 19, wherein the index table and the one or more encrypted message segments are transmitted to the receiving computing device over separate communication channels.

* * * * *